United States Patent Office 2,719,834
Patented Oct. 4, 1955

2,719,834

FIBER-FORMING POLYMERS

Alfred B. Craig and George E. Ham, Dayton, Ohio, assignors, by mesne assignments, to The Chemstrand Corporation, a corporation of Delaware No Drawing. Application January 26, 1951,
Serial No. 208,088

15 Claims. (Cl. 260—45.5)

This invention relates to polymeric compositions having unusual fiber-forming properties. More specifically the invention relates to polymeric acrylonitrile compositions capable of being converted readily into dyeable general purpose fibers.

It is well-known that polyacrylonitrile, and various copolymers of acrylonitrile and other olefinic monomers, can be spun into synthetic fibers having unusual physical properties. Because polyacrylonitrile and the many copolymers of acrylonitrile are almost inert chemically, conventional dyeing procedures are not useful in processing them. Many copolymers of acrylonitrile have been prepared using as the comonomers substances which impart dye affinity. Copolymers of this type are not always satisfactory because of the excessive cost of the dye-receptive comonomers and because the introduction of such substances often depreciates the desirable fiber-forming characteristics of the copolymer.

The primary purpose of this invention is to provide a new acrylonitrile polymer composition which has the chemical and physical properties of polyacrylonitrile, but which is also completely dye-receptive or can be made so by simple readily practicable procedures. A further purpose of this invention is to provide a means for converting non-dyeable acrylonitrile polymers into a dye-receptive form. A still further purpose is to provide new general purpose synthetic fibers.

In accordance with this invention it has been found that polyacrylonitrile and other non-dyeable polymers of acrylonitrile, for example the copolymers of over 80 per cent acrylonitrile and up to 20 per cent of other olefinic monomers, such as vinyl acetate, styrene, α-methylstyrene, methacrylonitrile, vinyl chloride, vinylidene chloride, and the various alkyl acrylates, alkyl methacrylates, alkyl fumarates, and alkyl maleates wherein the alkyl groups have up to four carbon atoms may be readily converted into dyeable polymers. This is achieved by blending the non-dyeable polymers with polymeric compositions derived by the polymerization of unsaturated esters of haloacetic acid. Suitable monomers for polymerization into the useful polymeric compositions are those represented by the generic formula:

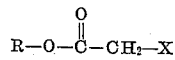

wherein X is a chlorine or bromine atom and R is a radical selected from the group consisting of vinyl, allyl, methallyl and isopropenyl. Suitable monomeric substances include vinyl chloroacetate, allyl chloroacetate, methallyl chloroacetate, isopropenyl chloroacetate, and the corresponding bromine analogues.

The proportions of the unsaturated halogen containing polymer will depend upon the degree of dye-receptivity desired, and upon the proportion of the alkenyl chloroacetate in the blending polymer. In general it is desirable to have from two to 20 per cent of the fiber-forming composition in the polymeric form of the alkenyl chloroacetate. Thus, if the blending polymer is 100 per cent alkenyl chloroacetate polymer, from two to 20 per cent will be required to develop suitable dye-receptivity. If a copolymer of the chloroacetate and another monomer is used, proportionately more will be required to obtain the desired end result. Copolymers of more than 30 per cent of the haloacetate monomers and up to 70 per cent of another olefinic monomer may be employed. These other monomers may be acrylonitrile, methacrylonitrile, vinyl acetate, vinyl chloride, vinylidene chloride, styrene, α-methylstyrene, and the various alkyl acrylates, alkyl methacrylates, alkyl fumarates, and the alkyl maleates, wherein the alkyl radicals have up to four carbon atoms. Because copolymers of acrylonitrile have unusual solvent and chemical resistance the preferred blending polymer is one of substantial portions of acrylonitrile and sufficient of the chloroacetate monomer to develop dye-receptivity in the portions to be blended with the fiber-forming acrylonitrile polymers. A very useful blending polymer is one of 50 per cent acrylonitrile and 50 per cent of the alkenyl chloroacetate, for example methallyl chloroacetate.

The base polymers are preferably prepared in an aqueous medium in the presence of a water-soluble peroxy catalyst and in the presence of an agent which maintains the polymer formed in a fine but granular dispersed condition. Suitable peroxy catalysts are the alkali metal persulfates and suitable dispersing agents are the alkali metal salts of sulfonated hydrocarbons. Polymerization may be conducted by batch procedures, by continuous procedure or by combinations of these procedures. A preferred method of preparation involves a batch procedure wherein the desired monomers are mixed and charged gradually throughout the polymerization. Unusually uniform polymers may be obtained by also charging the catalyst and emulsifier continuously or in increments throughout the course of the reaction. More uniform polymerization conditions may be achieved by operating at uniform temperatures, for example the reflux temperature of the medium, especially if the operation is so conducted as to provide a constant temperature at reflux.

If desired, the polymerization reaction may be conducted in the presence of a "redox" agent, for example, sulfur dioxide, sodium bisulfite, sodium thiosulfate, or other sulfur compounds in which the sulfur is present in an oxidizable condition. Other optional procedures may involve the use of regulators which serve as chain terminators to prevent the formation of very high molecular weight increments, agents of this type being t.-dodecyl mercaptan, thioglycolic acid, and thioglycidol.

The procedure for preparing blending polymer is substantially the same as that used in the preparation of the base polymer.

In order to convert the chloroacetate polymers or the fiber-forming blends containing an increment of the chloroacetate polymers, it is necessary to react the chloroacetate group with a compound which will introduce an amino nitrogen atom. Suitable reagents of this type are ammonia, the aliphatic primary, secondary, and tertiary amines and the heterocyclic nitrogen compounds.

In this manner a nitrogen atom is introduced into the molecule which will provide a nucleus for chemical reaction with conventional acid dyestuffs. Suitable amines for use in the development of dye-receptivity are methylamine, n-butylamine, ethylene diamine, ethanolamine, diethylamine, ethylisopropylamine, diethanolamine, dicyclohexylamine, triethanolamine, triethylamine, trimethylamine, hexamethylene tetramine, morpholine, piperidine, imidazole and pyridine.

The polymer may be treated with the various nitrogen compounds in granular solid state, in solution in a suitable solvent, and in the form of a spun fiber. If the polymer is in solid form, obviously only the surface will be reacted chemically, and if the polymer is treated in solid form before spinning the activated surface may be substantially diluted when the polymer is dissolved and reformed into fibers. Accordingly, the most effective procedure involves chemical treatment in solution state. This modification may take place in the spinning solution from which the fibers will ultimately be prepared. Accordingly, the polymers are each dissolved, separate or together in suitable solvents, for example, N,N-dimethylformamide, γ-butyrolactone, ethylene carbonate, or other conventional polyacrylonitrile solvents. Since ammonia and the primary and secondary amines may often produce gelled spinning solutions due to the cross-linking of the polymer, the use of tertiary amines in the treatment of polymers in solution state is recommended. The primary and secondary amines are effective in treating the surface of previously prepared fibers, and ammonia is especially useful in this respect. The tertiary amines, which are most effective in treating polymer solutions, convert the halogen atoms into quaternary ammonium halides which are especially effective in developing dye affinity.

The blends of the acrylonitrile fiber-forming polymers and the haloacetate polymers may also be treated with other reagents to develop dye-receptivity. Thiourea and the various alkyl substituted thioureas are especially effective in this respect, the reaction being made on the polymer in solid form or in solution. This treatment may be made simultaneously with the dyeing by incorporating the thiourea with the dye bath when conventional acid dyes are used. The thiourea reacts with the fiber during the dyeing operation thereby developing superior dye-receptivity.

The new blended compositions may also be rendered dye-receptive by reaction with mercapto substituted heterocyclic nitrogen compounds, for example, 2-mercaptobenzothiazole. This reaction also may be effected with the polymer in finely divided solid state, in fiber form or in solution in a suitable solvent.

In the practice of this invention the dyeable fiber-forming compositions are prepared by mixing the solid polymers in suitable conventional mechanical mixers, for example, Banbury mixers, roll mills, or dough mixers. In general, it is desirable to add the solvents or plasticizers for fiber-forming acrylonitrile polymers. The intimate mixing of the polymers or blended polymers with the reagent may induce the reaction of substantially all of the chloroacetate groups. Less thorough mixing, and especially if the polymer solutions are quite viscose will induce the reaction of only a small proportion, for example from five to 50 per cent of the chloroacetate groups with the amine. Under such conditions it will be necessary to add more of the chloroacetate polymers in order to develop the desirable extent of dye-receptivity. Thus, the manner of mixing and the viscosity of the blending mixture must be considered in selecting the proper proportions of polymers.

The new blended compositions may be fabricated into synthetic fibers by conventional wet or dry spinning procedures. After stretching the fibers to develop the necessary orientation and the incident tensile strength, and thereafter shrinking the fibers to improve their thermal resistance, valuable general purpose fibers are obtained.

Further details of this invention are set forth with respect to the following examples:

*Example 1*

A 2-liter flask provided with a stirring mechanism, a dropping funnel and a reflux condenser was charged with 700 ml. of water and six grams of the sodium salt of dialkyl sulfosuccinate. The reaction vessel was heated to approximately the boiling temperature and a mixture of 180 grams of acrylonitrile and 120 grams of methallyl chloroacetate was added gradually over a four-hour period. The reaction was conducted at reflux temperature. During the reaction a solution of 12 grams of potassium persulfate and 12 grams of sodium bicarbonate in 400 cc. of water was added in equal increments at 15 minute intervals. When all of the monomers had been added the reaction mixture was steam distilled to remove unreacted monomers. The polymer was coagulated by freezing and separated by filtering. The polymer so obtained contained 39.5 per cent of methallyl chloroacetate in polymer form.

*Example 2*

A solution of 40 grams of the polymer described in the preceding example in 160 grams of N,N-dimethylacetamide was treated for three hours at room temperature with a solution of six grams of trimethylamine dissolved in 80 grams of N,N-dimethylacetamide. Analysis of the product showed that 85 per cent of the total chlorine was converted to ionic chlorine by quaternization.

*Example 3*

A 190 gram sample of a solution containing 30.4 grams of a copolymer of 97 per cent of acrylonitrile and three per cent of vinyl acetate dissolved in dimethylacetamide was blended with 40 grams of the solution described in Example 2. The blended polymer solution was spun through a spinneret having 30 apertures, each 0.005 inch in diameter into a mixture of 60 per cent of dimethylacetamide and 40 per cent of water. Thereafter the extruded fiber was washed with water, stretched about 500 per cent. The finished fiber was found to have a tenacity of 3.0 grams per denier, an elongation of six per cent, and a ten per cent boil shrinkage.

A skein of this fiber was treated for one hour at 100° C, in a dyebath containing 0.02 gram of Wool Fast Scarlet G Supra dye, 0.1 gram of sulfuric acid, and 40 ml. of water for each gram of fiber. The dyebath was essentially exhausted and the treated fiber acquired a brilliant scarlet color.

*Example 4*

A sample (176.8 grams) of a copolymer of 97 per cent of acrylonitrile and three per cent of vinyl acetate was dissolved in 937.5 grams of dimethylacetamide at 80° C. The solution was blended with 122 grams of the solution prepared in accordance with the procedure described in Example 2. Fibers spun from this blended solution had a tenacity of 2.7 grams per denier, and an elongation of six per cent. A skein of this fiber was dyed to a brilliant red shade by the standard dyebath described in the preceding example.

*Example 5*

A copolymer containing 49.8 percent of methallychloroacetate was prepared by the procedure described in Example 1. Twenty grams of this copolymer was dissolved in 80 grams of N,N-dimethylacetamide and a solution of 4.9 grams of trimethylamine dissolved in 52.6 grams of N,N-dimethylacetamide was added thereto. The solution was heated at 60° C. for one or two hours to effect quaternization.

*Example 6*

A copolymer of 97 percent of acrylonitrile and three per cent of vinyl acetate was dissolved to the extent of 20 per cent in N,N-dimethylacetamide at 80° C. This solution was blended with a 69 gram sample of the solution described in Example 5. The blended solution which was clear and light yellow in color was spun by the procedure described in Example 3. The fiber so prepared had excellent dye receptivity under the conditions described in Example 3.

*Example 7*

A sample of the solution described in Example 5 (32 grams) was blended with 100 grams of a solution in N,N-dimethylacetamide containing 17 grams of a copolymer of 92 per cent of acrylonitrile and eight per cent of N,N-dimethylmethacrylamide. Fibers spun from this blended solution showed excellent dyeability with Wool Fast Scarlet G Supra dye.

*Example 8*

A copolymer containing 32.6 per cent of vinylchloroacetate was prepared by the method described in Example 1. An 18 per cent solution of this copolymer in N,N-dimethylacetamide was prepared and treated with a stoichiometric amount of trimethylamine (based on the total chlorine present). This solution was diluted with 65.8 grams of dimethylacetamide and 14 grams of 97 per cent of acrylonitrile and three per cent of vinyl acetate were added thereto. After heating at 90 to 95° C. for one hour, a clear light colored spinning solution was obtained. Fibers spun from this solution had excellent dye acceptance.

*Example 9*

A blend of 1.2 grams of polyvinyl chloroacetate and 13.9 grams of a copolymer of 95 per cent of acrylonitrile and five per cent of vinyl acetate was prepared by mixing the dry polymers. The blended mixture was dissolved in 85 grams of N,N-dimethylacetamide and fibers were spun from the solution. A skein of fiber (0.7 gram) was treated for three hours at 100° C. in a dyebath containing 32 cc. of water, 0.014 gram of Wool Fast Scarlet G Supra dye, 0.07 gram of sulfuric acid, and 0.048 gram of thiourea. The dye acceptance was such that the dyebath was exhausted by the treatment.

*Example 10*

A dry blend of 2.6 grams of a copolymer of 67.4 per cent of acrylonitrile and 32.6 per cent of vinyl chloroacetate, and 14.4 grams of a copolymer of 97 per cent of acrylonitrile and three per cent of vinyl acetate was dissolved in 83 grams of N,N-dimethylacetamide. The fiber spun by the procedure described in Example 3 was found to have a tenacity of 3.3 grams per denier. A 1.15 gram skein of this fiber was treated in a dyebath containing 46 grams of water, 0.023 gram of Wool Fast Scarlet G Supra dye, 0.115 gram of sulfuric acid and 0.115 gram of thiourea. A virtually complete exhaustion of the dyebath was obtained in three hours at 100° C.

*Example 11*

A mixture of 11.6 grams of the polymer described in Example 1 and 77.9 grams of a copolymer of 97 per cent of acrylonitrile and three per cent of vinyl acetate was prepared by mixing the solid polymers. The mixture so obtained was added to 468 grams of N,N-dimethylacetamide and stirred until complete solution took place. Fibers prepared by the procedure described in preceding examples were dyed in a dyebath containing 0.05 per cent of Wool Fast Scarlet G Supra dye and 0.25 per cent of sulfuric acid. 40 cc. of the dyebath was used for each gram of fiber. Several different treatments were made using 0, 5, 10, 20, and 50 per cent of thiourea based on fiber weight. After one hour at 100° C. the sample dyed in the absence of thiourea showed essentially no dye pick-up. Although all of the remaining samples were readily dye-receptive, the optimum result was achieved with about ten per cent of thiourea (based on fiber weight) in the dyebath.

What is claimed is:

1. A fiber-spinning composition comprising a blend of 50 to 98 parts by weight of (A) a polymer of at least 80 percent by weight of acrylonitrile and up to 20 percent of another mono-olefinic monomer copolymerizable therewith and from two to 50 parts of (B) a polymer of at least 30 percent by weight of an alkenyl haloacetate of the structure:

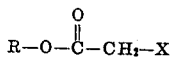

wherein X is a halogen atom selected from the group consisting of chlorine and bromine and R is a radical selected from the group consisting of vinyl, allyl, methallyl and isopropenyl, and up to 70 percent of another monoolefinic monomer copolymerizable therewith, and wherein the only source of the alkenyl haloacetate in the blend is the (B) polymer.

2. The composition defined in claim 1 wherein the alkenyl haloacetate is vinyl chloroacetate.

3. The composition defined in claim 1 wherein the alkenyl haloacetate is allyl chloroacetate.

4. The composition defined in claim 1 wherein the alkenyl haloacetate is methallyl chloroacetate.

5. The composition defined in claim 1 wherein the alkenyl haloacetate is isopropenyl chloroacetate.

6. A dyeable fiber-spinning composition as defined in claim 1 and characterized in that the alkenyl haloacetate polymer has been reacted with a compound of the group consisting of ammonia, primary, secondary and tertiary aliphatic amines.

7. A dyeable fiber-spinning composition as defined in claim 6 wherein the compound is trimethylamine.

8. A dyeable fiber-spinning composition as defined in claim 6 wherein the compound is triethylamine.

9. A dyeable fiber-spinning composition as defined in claim 6 wherein the compound is triethanolamine.

10. A fiber-spinning composition comprising a blend of 50 to 98 parts by weight of (A) a polymer of at least 80 percent by weight of acrylonitrile and up to 20 percent of a monoolefinic monomer copolymerizable therewith selected from the group consisting of vinyl acetate, vinyl chloride, vinylidene chloride, methacrylonitrile, styrene, dialkyl fumarates, dialkyl maleates, alkyl acrylates and alkyl methacrylates wherein the alkyl groups have up to four carbon atoms, and from two to 50 parts of (B) a polymer of at least 30 percent by weight of an alkenyl haloacetate of the structure:

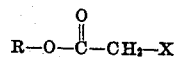

wherein X is a halogen atom selected from the group consisting of chlorine and bromine and R is a radical selected from the group consisting of vinyl, allyl, methallyl and isopropenyl, and up to 70 percent of another monoolefinic monomer copolymerizable therewith selected from the group consisting of vinyl acetate, acrylonitrile, vinyl chloride, vinylidene chloride, methacrylonitrile, styrene, dialkyl fumarates, dialkyl maleates, alkyl acrylates and alkyl methacrylates, wherein the alkyl groups have up to four carbon atoms, and wherein the only source of the alkenyl haloacetate in the blend is the (B) polymer.

11. A method of preparing a dyeable fiber-spinning composition which comprises blending from 50 to 98 parts by weight of (A) a polymer of at least 80 percent by weight of acrylonitrile and up to 20 percent of another mono-olefinic monomer copolymerizable therewith, and from two to 50 parts of (B) a polymer of at least 30 percent by weight of an alkenyl haloacetate of the structure:

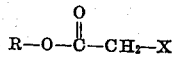

wherein X is a halogen atom selected from the group consisting of chlorine and bromine and R is a radical selected from the group consisting of vinyl, allyl, methallyl and isopropenyl, and up to 70 percent of another monoolefinic monomer copolymerizable therewith, the only source of alkenyl haloacetate in the blend being the (B) polymer, and reacting the blended polymer with a compound of the group consisting of ammonia, primary, secondary, and tertiary aliphatic amines.

12. A method of preparing a dyeable fiber-spinning composition which comprises reacting (A) a polymer of at least 30 percent by weight of an alkenyl haloacetate of the structure:

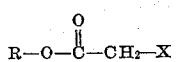

wherein X is a halogen atom selected from the group consisting of chlorine and bromine and R is a radical selected from the group consisting of vinyl, allyl, methallyl and isopropenyl, and up to 70 percent of another monoolefinic monomer copolymerizable therewith with a compound of the group consisting of ammonia, primary, secondary, and tertiary aliphatic amines, and blending the reacted polymer with (B) a polymer of at least 80 percent by weight of acrylonitrile and up to 20 percent of another mono-olefinic monomer copolymerizable therewith, said polymer (A) being the only source of alkenyl haloacetate in the blended polymer.

13. The fiber formed from the composition defined in claim 1.
14. The fiber formed from the composition defined in claim 6.
15. The fiber formed from the composition defined in claim 11.

References Cited in the file of this patent
UNITED STATES PATENTS

| | | |
|---|---|---|
| 2,118,713 | Rein | May 24, 1938 |
| 2,436,926 | Jacobson | Mar. 2, 1948 |
| 2,613,196 | Ham | Oct. 7, 1952 |
| 2,635,092 | Ham | Apr. 14, 1953 |